(12) United States Patent
Rasch et al.

(10) Patent No.: US 8,584,087 B2
(45) Date of Patent: Nov. 12, 2013

(54) APPLICATION CONFIGURATION DEPLOYMENT MONITOR

(75) Inventors: Tobias Rasch, Wiesloch (DE); Wolfram Hinkel, Angelbachtal (DE)

(73) Assignee: SAP AG, Walldorf (DE)

( * ) Notice: Subject to any disclaimer, the term of this patent is extended or adjusted under 35 U.S.C. 154(b) by 1005 days.

(21) Appl. No.: 12/636,479

(22) Filed: Dec. 11, 2009

(65) Prior Publication Data
US 2011/0145789 A1   Jun. 16, 2011

(51) Int. Cl.
*G06F 9/44* (2006.01)

(52) U.S. Cl.
USPC .............................. 717/121; 717/120; 717/127

(58) Field of Classification Search
None
See application file for complete search history.

(56) References Cited

U.S. PATENT DOCUMENTS

| | | |
|---|---|---|
| 4,501,528 A | 2/1985 | Knapp |
| 5,978,579 A | 11/1999 | Buxton et al. |
| 6,161,123 A | 12/2000 | Renouard et al. |
| 6,161,176 A | 12/2000 | Hunter et al. |
| 6,185,587 B1 | 2/2001 | Bernardo et al. |
| 6,301,710 B1 | 10/2001 | Fujiwara |
| 6,324,578 B1 | 11/2001 | Cox et al. |
| 6,397,232 B1 | 5/2002 | Cheng-Hung et al. |
| 6,449,624 B1 | 9/2002 | Hammack et al. |
| 6,466,972 B1 | 10/2002 | Paul et al. |
| 6,470,464 B2 | 10/2002 | Bertram et al. |
| 6,513,045 B1 | 1/2003 | Casey et al. |
| 6,523,027 B1 | 2/2003 | Underwood |
| 6,539,372 B1 | 3/2003 | Casey et al. |
| 6,728,877 B2 | 4/2004 | Mackin et al. |
| 7,089,317 B2 | 8/2006 | Jeyaraman et al. |
| 7,099,945 B2 | 8/2006 | Lugger et al. |
| 7,181,731 B2 | 2/2007 | Pace et al. |
| 7,228,326 B2 | 6/2007 | Srinivasan et al. |
| 7,376,682 B2 | 5/2008 | Ramacher et al. |
| 7,519,964 B1 | 4/2009 | Islam et al. |
| 7,590,669 B2 | 9/2009 | Yip et al. |
| 7,609,651 B1 | 10/2009 | Mcbride et al. |

(Continued)

FOREIGN PATENT DOCUMENTS

| | | |
|---|---|---|
| JP | 2004287972 A | 10/2004 |
| WO | WO-2004114130 A2 | 12/2004 |
| WO | WO-2005045670 A1 | 5/2005 |

OTHER PUBLICATIONS

"U.S. Appl. No. 11/512,440, Notice of Allowance mailed Nov. 12, 2010.", 14 pgs.

(Continued)

*Primary Examiner* — Kris Rhu
(74) *Attorney, Agent, or Firm* — Schwegman Lundberg & Woessner, P.A.

(57) ABSTRACT

Various embodiments include at least one of systems, methods, and software for monitoring application instance configurations and deployments. One such embodiment, in the form of a method includes executing, on at least one processor, an application deployment process to deploy at least one set of configuration settings stored in a memory device of an application configuration environment to an application instance in an application execution environment. The method may also include writing and storing data to a deployment log representative of application deployment process actions performed and an indicator of success of each of the performed actions. The deployment log data may then be retrieved from the data storage device and a view may be generated and presented providing a summary of actions performed and actions that were not successful. Other embodiments are described herein.

18 Claims, 10 Drawing Sheets

(56) References Cited

U.S. PATENT DOCUMENTS

| | | | |
|---|---|---|---|
| 7,657,887 | B2 | 2/2010 | Kothandraman et al. |
| 7,685,577 | B2 | 3/2010 | Pace et al. |
| 7,908,589 | B2 | 3/2011 | Sattler et al. |
| 2001/0044834 | A1 | 11/2001 | Bradshaw et al. |
| 2002/0004824 | A1* | 1/2002 | Cuan et al. ............. 709/208 |
| 2002/0026572 | A1 | 2/2002 | Joory |
| 2002/0095663 | A1 | 7/2002 | Joory |
| 2002/0104097 | A1 | 8/2002 | Jerding et al. |
| 2002/0116373 | A1 | 8/2002 | Nishikawa et al. |
| 2002/0138570 | A1 | 9/2002 | Hickey |
| 2002/0147784 | A1 | 10/2002 | Gold et al. |
| 2002/0156947 | A1 | 10/2002 | Nishio |
| 2002/0188625 | A1 | 12/2002 | Jans et al. |
| 2003/0005411 | A1 | 1/2003 | Gerken |
| 2003/0084018 | A1* | 5/2003 | Chintalapati et al. ............ 707/1 |
| 2003/0115292 | A1 | 6/2003 | Griffin et al. |
| 2003/0120780 | A1 | 6/2003 | Zhu et al. |
| 2003/0227392 | A1 | 12/2003 | Ebert et al. |
| 2003/0237093 | A1 | 12/2003 | Marsh et al. |
| 2004/0060047 | A1 | 3/2004 | Talati et al. |
| 2004/0111417 | A1 | 6/2004 | Goto et al. |
| 2004/0176996 | A1 | 9/2004 | Powers et al. |
| 2004/0186927 | A1 | 9/2004 | Eryurek et al. |
| 2005/0044215 | A1 | 2/2005 | Cohen et al. |
| 2005/0044546 | A1 | 2/2005 | Niebling et al. |
| 2005/0080801 | A1 | 4/2005 | Kothandaraman et al. |
| 2005/0086195 | A1 | 4/2005 | Tan et al. |
| 2005/0108219 | A1 | 5/2005 | De La Huerga |
| 2005/0108707 | A1 | 5/2005 | Taylor et al. |
| 2005/0144474 | A1 | 6/2005 | Takala et al. |
| 2005/0188422 | A1 | 8/2005 | Jooste |
| 2005/0262499 | A1 | 11/2005 | Read |
| 2005/0268282 | A1 | 12/2005 | Laird |
| 2005/0278280 | A1 | 12/2005 | Semerdzhiev et al. |
| 2006/0047793 | A1 | 3/2006 | Agrawal et al. |
| 2006/0173857 | A1 | 8/2006 | Jackson |
| 2006/0184917 | A1 | 8/2006 | Troan et al. |
| 2006/0184926 | A1 | 8/2006 | Or et al. |
| 2006/0224637 | A1 | 10/2006 | Wald |
| 2006/0242697 | A1 | 10/2006 | Takemura |
| 2006/0248450 | A1 | 11/2006 | Wittenberg et al. |
| 2006/0253588 | A1 | 11/2006 | Gao et al. |
| 2007/0016591 | A1 | 1/2007 | Beadles et al. |
| 2007/0025704 | A1 | 2/2007 | Tsukazaki et al. |
| 2007/0074203 | A1 | 3/2007 | Curtis et al. |
| 2007/0093926 | A1 | 4/2007 | Braun et al. |
| 2007/0097975 | A1 | 5/2007 | Rakers et al. |
| 2007/0143379 | A1* | 6/2007 | i Dalfo et al. ............. 707/205 |
| 2007/0157192 | A1 | 7/2007 | Hoefler et al. |
| 2007/0168065 | A1 | 7/2007 | Nixon et al. |
| 2007/0198437 | A1 | 8/2007 | Eisner et al. |
| 2008/0059474 | A1 | 3/2008 | Lim |
| 2008/0059490 | A1 | 3/2008 | Sattler et al. |
| 2008/0059537 | A1 | 3/2008 | Sattler et al. |
| 2008/0059630 | A1 | 3/2008 | Sattler et al. |
| 2008/0071555 | A1 | 3/2008 | Sattler et al. |
| 2008/0071718 | A1 | 3/2008 | Sattler et al. |
| 2008/0071828 | A1 | 3/2008 | Sattler et al. |
| 2008/0071839 | A1 | 3/2008 | Sattler et al. |
| 2008/0082517 | A1 | 4/2008 | Sattler et al. |
| 2008/0126375 | A1 | 5/2008 | Sattler et al. |
| 2008/0126448 | A1 | 5/2008 | Sattler et al. |
| 2008/0127082 | A1 | 5/2008 | Birimisa et al. |
| 2008/0127084 | A1* | 5/2008 | Sattler et al. .................. 717/121 |
| 2008/0127085 | A1 | 5/2008 | Sattler et al. |
| 2008/0127086 | A1 | 5/2008 | Sattler et al. |
| 2008/0127123 | A1 | 5/2008 | Sattler et al. |
| 2008/0195579 | A1 | 8/2008 | Kennis et al. |
| 2009/0024990 | A1 | 1/2009 | Singh et al. |
| 2009/0157455 | A1 | 6/2009 | Kuo et al. |
| 2010/0131084 | A1* | 5/2010 | Van Camp .................. 700/86 |
| 2010/0281456 | A1* | 11/2010 | Eizenman et al. ............ 717/104 |
| 2011/0145789 | A1 | 6/2011 | Rasch et al. |

OTHER PUBLICATIONS

"U.S. Appl. No. 11/512,440, Response filed Oct. 18, 2010 to Non Final Office Action mailed Jun. 17, 2010", 11 pgs.

Ganguly, et al., "Reducing Complexity of Software Deployment with Delta Configuration", IEEE, (May 21, 2007), 729-732.

Sloane, et al., "Modeling Deployment and Configuration of Cobra Systems with UML", IEEE, (2000), 778.

Ying Li, et al., "Modeling and Verifying Configuration in Service Deployment", IEEE, (2006), 8 pgs.

"U.S. Appl. No. 11/512,442, Non Final Office Action mailed Oct. 1, 2009", 15 pgs.

"U.S. Appl. No. 11/512,443, Non-Final Office Action mailed Jul. 9, 2008", 17 pgs.

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,443, Response filed Oct. 9, 2008 to Non-Final Office Action mailed Jul. 9, 2008", 11 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Non-Final Office Action mailed Oct. 29, 2008", 13 pgs.

"U.S. Appl. No. 11/512,517, Notice of Allowance mailed Apr. 3, 2009", 10 pgs.

"U.S. Appl. No. 11/512,517, Response filed Jan. 29, 2009 to Non-Final Office Action mailed Oct. 29, 2008", 16 pgs.

"U.S. Appl. No. 11/512,519, Final Office Action mailed Feb. 2, 2009", 14 pgs.

"U.S. Appl. No. 11/512,519, Non-Final Office Action mailed Sep. 11, 2008", 14 pgs.

"U.S. Appl. No. 11/512,519, Response filed Nov. 11, 2008 to Non-Final Office Action mailed Sep. 11, 2008", 15 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Final Office Action mailed Nov. 20, 2009", 15 pgs.

"U.S. Appl. No. 11/512,609, Final Office Action mailed Dec. 8, 2008", 12 pgs.

"U.S. Appl. No. 11/512,609, Non Final Office Action mailed Apr. 27, 2009", 15 pgs.

"U.S. Appl. No. 11/512,609, Non Final Office Action mailed Jun. 19, 2008", 9 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,609, Response filed Sep. 19, 2008 to Non-Final Office Action mailed Jun. 19, 2008", 8 pgs.

"U.S. Appl. No. 11/512,884, Non-Final Office Action Mailed Jul. 29, 2008", 12 pgs.

"U.S. Appl. No. 11/512,884, Final Office Action mailed Dec. 19, 2008", 11 pgs.

"U.S. Appl. No. 11/512,884, Response filed Oct. 28, 2008 to Non Final Office Action mailed Jul. 29, 2008", 17 pgs.

(56) References Cited

OTHER PUBLICATIONS

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Non-Final Office Action mailed Dec. 26, 2008", 10 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Sep. 22, 2009 to Final Office Action mailed Jun. 24, 2009", 10 pgs.

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Partial International Search Report mailed Dec. 27, 2007", 8 pgs.

"International Application Serial No. PCT/EP2007/007462, Written Opinion Mailed Mar. 17, 2008", 8 pgs.

"International Application Serial No. PCT/EP2007/007490, International Search Report Oct. 26, 2007", 4 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

Indigorose, "Setup Factory", *User's Guide IndigoRose Software Design No. 2*, (Mar. 1998), 82 pgs.

Liu, et al., "A Knowledge-Based Approach to Requirements Analysis", (1995), 26-33.

"U.S. Appl. No. 11/512,440, Non-Final Office Action mailed Jun. 17, 2010", 14 pgs.

US 7,571,147, 08/2009, Sattler et al. (withdrawn)

\* cited by examiner

APPLICATION CONFIGURATION DEPLOYMENT MONITOR

BACKGROUND INFORMATION

Configuring software applications can be a difficult task. The difficulty in configuring such systems grows in complexity as the size of the software application increases. An example of a complex software application to configure is an enterprise resource planning ("ERP") application. Efforts to configure such applications often involve a large number of employees and consultants. Modifying a large software application configuration or upgrading such an application can involve equal amounts of time and cost as an initial implementation.

A major cause for the complexity of modifying and upgrading such software applications is that configuration settings are often stored in configuration tables. The configurations settings in these tables do not provide context of what the configuration setting is for, other than by reference to a manual or from the experience of person modifying the setting.

Prior efforts have provided solutions that separate an application configuration environment from an application execution environment. In some instances, such as in U.S. Published patent application Ser. No. 11/512,440 entitled DEPLOYMENT (filed Aug. 29, 2006), a deployment process may execute to deploy configuration settings from the application configuration environment to the application execution environment. As the deployment is performed, a log of deployment activity is created along with an indicator of the status of the deployment activities, such as success or failure. Following deployment, to view the logs, an administrator wishing to view the result of a deployment opens the log for the individual application instance that was deployed. The results of the deployment provide a great amount of detail, but do not provide a summary of what deployment activities were successful and which were not. Further, an administrator may be responsible for multiple deployed application instances across a number of application execution environments. To view the results of multiple deployments, the administrator is required to log into each application instance in each application execution environment to search through the deployment logs to determine the deployment status of each application instance. Further, if an application configuration has been modified in an application configuration environment, the administrator will not be aware of the differences unless the administrator has been notified by the person or process making the configuration changes.

DETAILED DESCRIPTION

Figure 1:
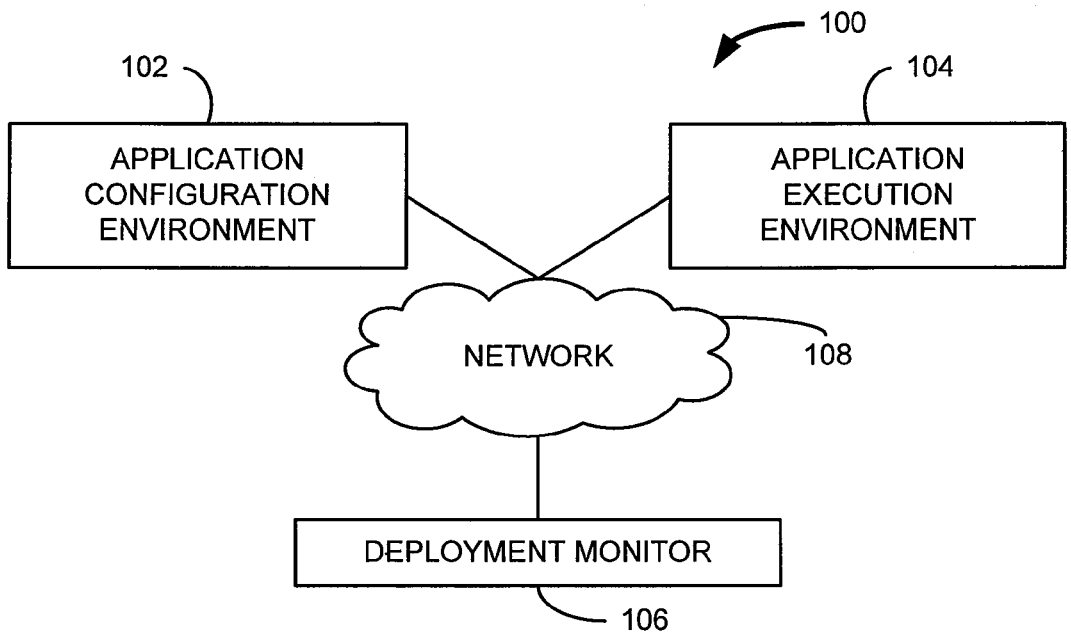
FIG. 1 is a block diagram of a system according to an example embodiment.

Various embodiments include at least one of systems, methods, and software that provide a view of deployment activities performed with regard to at least one application instance deployed to an application execution environment. The view in some such embodiments includes a summarized deployment status view of each of a plurality of content types deployed to a plurality of application instances. The application instances in such embodiments may be deployed to one or more application execution environments. The application instances in some embodiments are hosted application instances for various organizations that subscribe to the application in a software-as-a-service (SaaS) arrangement. Thus, the deployment activity view, in some embodiments, provides an administrator a view of deployment statuses for each of a plurality of application instances deployed from one or more application configuration environments to one or more application execution environments. Such embodiments do not require the administrator to log in to each application instance in the various application execution environments, instead providing a single view regardless of the application configuration environments within which application instances are configured or the execution environments within which the application instances are deployed. The view in some such embodiments may also provide a view or indicator of modified configuration settings in an application configuration environment that are not yet deployed. The view in these and other embodiments may also provide a view or indicator of other statuses, such as available application and content updates not yet deployed, application instance or content activation status, and the update status of other elements of an application instance.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending limit the scope of this application to any single invention or inventive concept if more than one is in fact disclosed. The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes an application configuration environment 102, an application execution environment 104, and a deployment monitor 106 connected to a network 108.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instances of the application in the application execution environment 104. Although only a single application configuration environment 102 and a single application execution environment 104 are illustrated, multiple application configuration environments 102 and multiple application execution environments 104 can exist. Deployment can thus be made from a particular application configuration environment 102 to one or more of the multiple application execution environments 104.

When an application configuration is deployed from an application configuration environment 102 to an application instance in an application execution environment 104 entries are made to a deployment log. The deployment log may be stored in one or more of the application execution environment 104, the application configuration environment 102, or in another location accessible over the network 108. Deployment log entries are maintained in the deployment log for each deployed application instance.

The deployment monitor 106 operates to retrieve data from one or more deployment logs and to provide at least a summarized view of application instance deployment activities with regard to application instances deployed to one or more application execution environments. An example embodiment including such a view is illustrated and described with regard to FIG. 7. In some embodiments, the deployment monitor 106 operates on a computing device distinct from computing devices that host the one or more application configuration environments 102 and one or more application execution environments 104. In other embodiments, the deployment monitor 106 may operate on one or more of the same computing devices hosting the application configuration environments 102 and application execution environments 104. In some embodiments, the deployment monitor 106 is a web-enable application that executes on an application server and provides views of the deployment status data through web pages or other web enabled user interfaces.

The network 108 may include one or more network types. For example, the network 108 may include one or more of the Internet, a local area network (LAN), a system area network (SAN), a virtual private network (VPN), or other network types.

Figure 2:
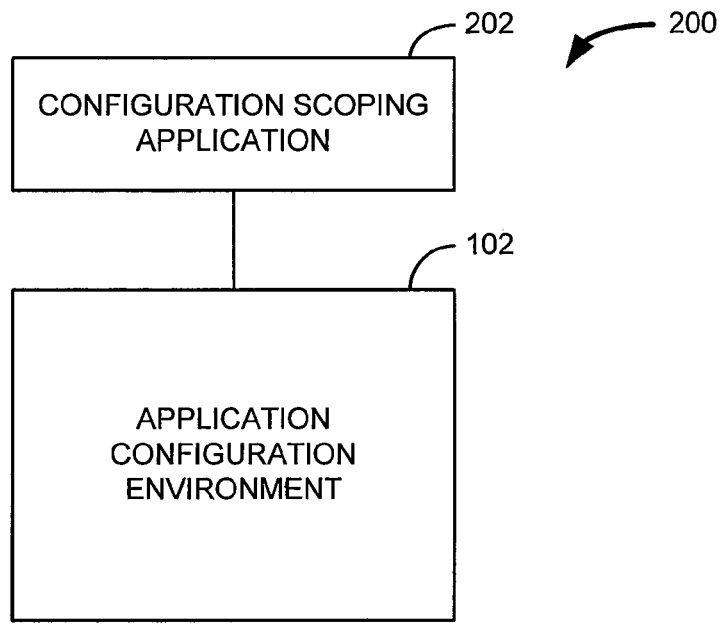
FIG. 2 is a block diagram of a system according to an example embodiment.

FIG. 2 is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions are linked to one of many adaptation catalog entries. The adaptation catalog entries include a representation of solution capabilities of an application to be configured, and eventually executed. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities be excluded.

Figure 3:
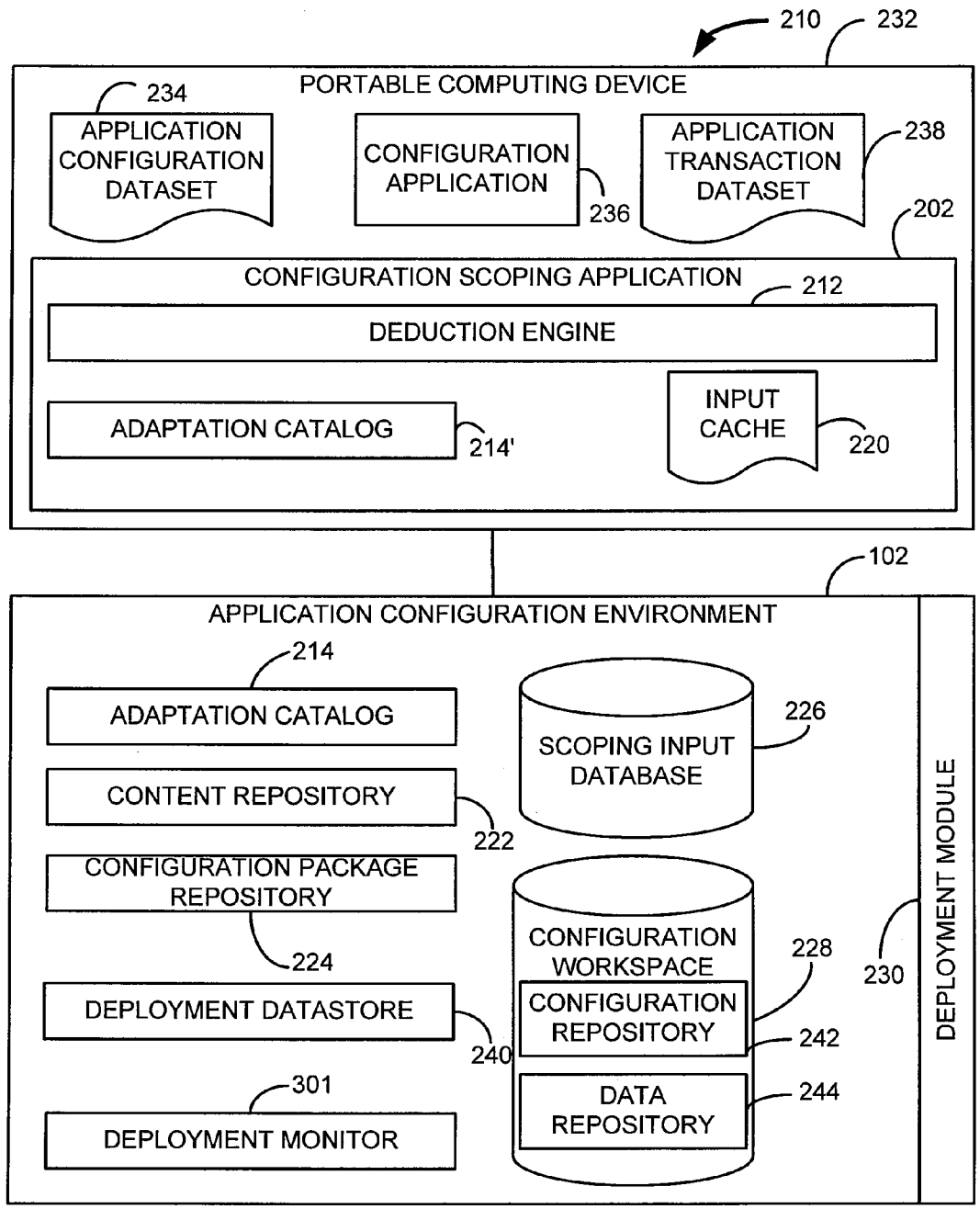
FIG. 3 is a block diagram of a system according to an example embodiment.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration. Scoping question answers may also be changed after the application is deployed to an application execution environment. Modifying a scoping question answer may result in a change of one or more areas, packages, topics, and options and may require a deployment to effect the scoping change. FIG. 3 provides further detail of some embodiments of the configuration scoping application 202 in conjunction with an embodiment of the application configuration environment 102.

FIG. 3 is a block diagram of a system 210 according to an example embodiment. The system 210 includes a portable computing device 232 including a configuration application 236, an application configuration dataset 234 stored in a memory, an application transaction dataset 238, and the configuration scoping application 202. The system 210 further includes the application configuration environment 102. Although the application configuration environment 102 is not illustrated within the portable computing device 232, in some embodiments, the application configuration environment 102 may reside within the portable computing device 232. In other embodiments, the application configuration environment 102, the configuration scoping application 202, the application configuration dataset 234, the configuration application 236, and the application transaction dataset 238 may all reside on a computing device other than the portable computing device 232, such as a server or multiple servers.

The configuration application 236, in some embodiments, provides a set of tools via user interfaces to a user, such as through web pages, web enabled user interfaces, and the like. The tools of the configuration application 236 may allow the user to modify answers to scoping question answers stored in an input cache 220 of the configuration scoping application 202, the application configuration dataset 234, and the application transaction dataset 238. The application configuration dataset 234 may be populated with data copied from a configuration repository 242 stored within a configuration workspace 228 of the application configuration environment 102. The application transaction dataset 238 may be populated with data copied from the content repository 222, from an application instance deployed to an application execution environment, or elsewhere.

Although the input cache 220 is illustrated within the configuration scoping application 202, the input cache 220 may exist separate from the configuration scoping application 202 within a memory of the portable computing device 232. In such embodiments, the input cache 220 may be populated with data copied from the scoping input database 226.

For the sake of understandability regarding several portions of the configuration scoping application 202 and the application configuration environment 102, these portions of the system 210 will be discussed followed by a more detailed discussion of the configuration application 236.

The configuration scoping application 202, in some embodiments, includes a deduction engine 212 and an adaptation catalog 214'. In this embodiment, the configuration scoping application 202 further includes the input cache 220.

The application configuration environment 102, in some embodiments, includes an adaptation catalog 214, a content repository 222, and a configuration package repository 224. In some such embodiments, the application configuration environment 102 further includes a scoping input database 226, a configuration workspace 118, a deployment module 230, and a deployment datastore 240.

The adaptation catalog 214 may include a representation of all of the solution capabilities of an application to be configured, and eventually executed. Each capability of an application to be configured is identified in an adaptation catalog 214 entry. The adaptation catalog 214 entries each may be identified as an area, package, topic, or option and may be organized in a hierarchy with a child identifying the parent. An example hierarchy is a "General Ledger" capability, which in some embodiments is a package having two topics, "cash based" and "accrual based" which are two application capabilities within the "General Ledger" capability.

The adaptation catalog 214 entries may further include scoping questions directed toward obtaining scoping information to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed by the deployment module 230 to an application execution environment.

In some embodiments, rules and entries in the adaptation catalog can be linked to a configuration package that exists in the configuration package repository 224. A configuration package includes one or more configuration settings that enable or disable functionality of the application when deployed by the deployment module 230 or by a configuration process within the application configuration environment 102 when configuring the application within the configuration workspace 228. A configuration package can further be linked to one or more content items or content item definitions stored in the content repository 222. Some such content types include report layouts, forms, user interfaces, communication specifications, documentation, and other content that can be used in an application when deployed. A communication specification can include an XML schema, an EDI schema and connectivity information, mappings between file layouts and application data storage mechanisms, such as databases, and other similar communication specifications.

The rules of adaptation catalog 214 entries may also be used by the deduction engine 212 of the configuration scoping application 202. The configuration scoping application 202 typically presents a user interface to a user that requests answers to questions. The questions to be asked via the user interface may be identified by the deduction engine 212 based on the adaptation catalog 214'. The adaptation catalog 214' is typically a copy of the adaptation catalog 214 from the application configuration environment 102. When an answer is received by the configuration scoping application 202 through the user interface, the answer may be stored in the input cache 220 of the configuration scoping application 202. The deduction engine 212 may then apply the rule associated with the adaptation catalog 214' entry of the question asked to the received answer. Through the application of the rule, in view of answers already received and rules already applied, the deduction engine 212 typically identifies a next question to ask. The identified question may then be presented to the user through the user interface. This process typically continues until all of the questions have been asked, the user is out of time, or the user has modified all previous scoping answers deemed necessary to effect a needed change. If questions remain that have not been answered, the process may be continued at a later time or rules specifying default areas, packages, topics, and options typically supply enough information to allow deployment of the application in a functional form.

After the scoping question have been answered, the answers, and any other information obtained from a sales lead or other user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information."

After the scoping information is within the scoping input database 226, a process within the application configuration environment 102 may execute to begin configuring an application in the configuration repository 242 of the configuration workspace 228. The configuration repository 242 may include a set of configuration tables that mirrors, at least in part, the configuration tables of the application. The configuration repository 242 may include a set of configuration tables for each of multiple instances of the application to allow use of the application configuration environment 102 to configure multiple application instances.

The process that configures the application may be configured to determine one or more configuration packages to instantiate in the configuration repository 242. Configuration packages, in some embodiments, may include one or a set of configuration settings to enable or disable certain capabilities of the application. Configuration packages, as mentioned above, may be linked to adaptation catalog 214 entries and rules associated with adaptation catalog 214 entries. Thus, the process that configures the application in the configuration repository 242 may be configured to query the scoping information in the scoping input database 226 to identify configuration packages to instantiate.

Some embodiments of the application configuration environment 102 may further include the deployment datastore 240. The deployment datastore 240 typically stores a representation of one or more application configurations of applications that have been deployed. The representations of the one or more application configuration may be stored or updated in the deployment datastore 240 by the deployment module 230 upon successful deployment of an application.

A representation of an application configuration typically includes data representative of the application configuration settings. In some embodiments, the representation may further include data representative of content deployed to the application.

The deployment datastore 240, in some embodiments, may be updated upon each configuration or content deployment to a deployed system. In some embodiments, the deployment datastore may further include a versioning mechanism that maintains not only a current configuration representation, but also historical representations.

In some embodiments, the deployment datastore 240, or a current copy thereof, may be maintained by an entity that developed, or otherwise offers for sale, the application. The deployment datastore 240 may be used by the entity to monitor current application usage, perform billing processes as a function of a current application configuration, provide application upgrade information based on portions of the application or content utilized, and for other purposes. In some embodiments, the entity may provide application updates, bug fixes, or other upgrades directly to a deployed application instance. Such updates, bug fixes, or other upgrades may be identified as relevant to a particular application instance as a function of the configuration representation in view of adaptation catalog 214 entries.

As described above, the configuration application 236, in some embodiments, may provide a set of tools via user interfaces to a user. The tools of the configuration application 236 typically allow the user to modify answers to scoping question answers stored in an input cache 220, the application configuration dataset 234, and the application transaction dataset 238. The application configuration dataset 234 may be populated with data copied from the configuration repository 242. The application transaction dataset 238 may be populated with data copied from either the content repository 222, from an application instance deployed to an application execution environment, or elsewhere. The input cache 220, if separate from the configuration scoping application 202 may be populated with scoping information copied from the scoping input database 226.

Figure 4:
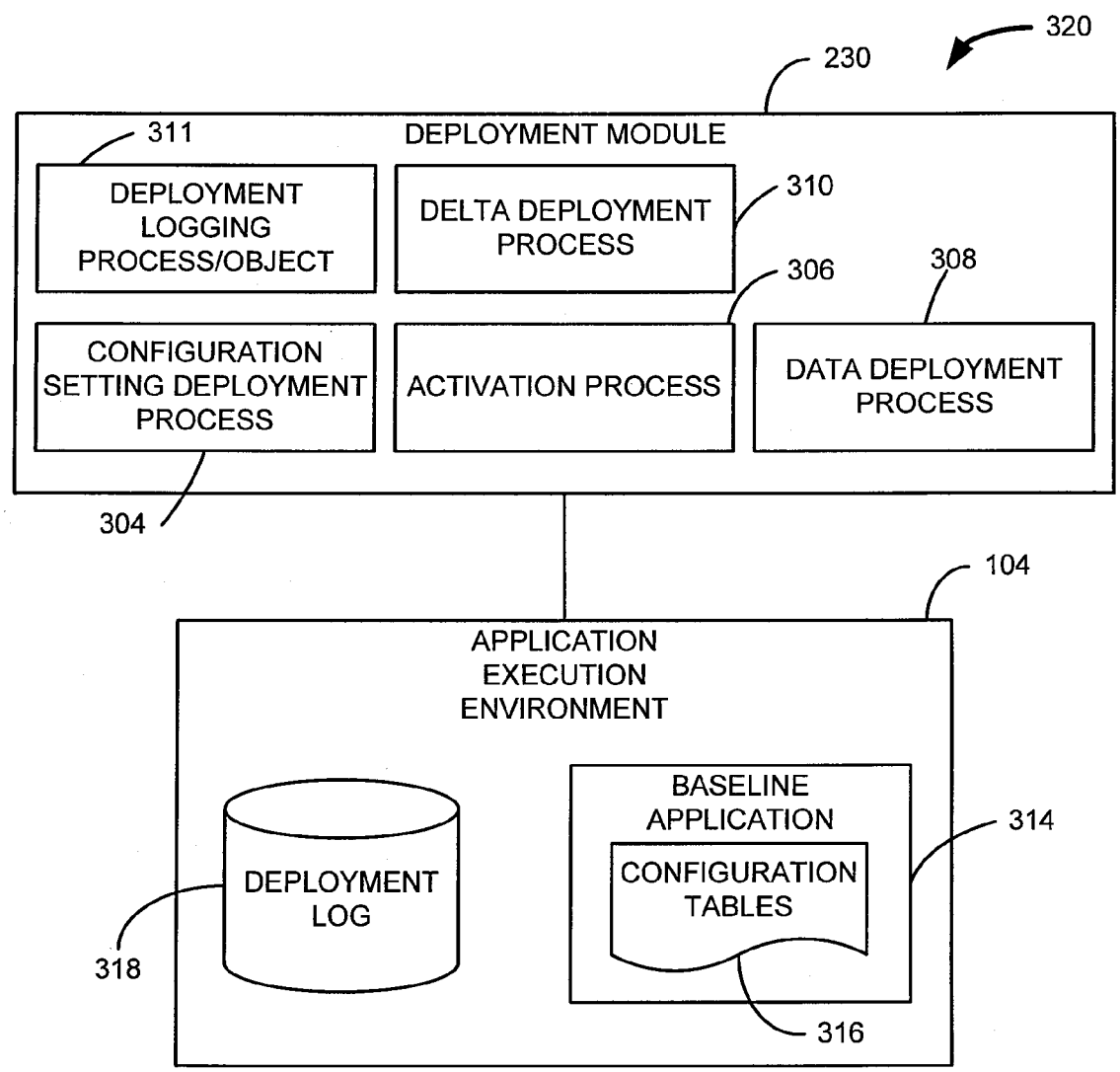
FIG. 4 is a block diagram of a system according to an example embodiment.

After the application has been configured or the configuration or content has been modified in the configuration workspace 228, the configuration can be deployed by the deployment module 230. Detail of the deployment module 230 is provided in FIG. 4. FIG. 4 is a block diagram of a system 320 according to an example embodiment. The system 320 typically includes the deployment module 230 and the application execution environment 104.

The deployment module 230 may include a configuration setting deployment process 304, an activation process 306, and a data deployment process 308. Some embodiments of the deployment module may further include one or both of a delta deployment process 310 and a deployment logging process or object 311.

The application execution environment 104 may include a baseline application 314. The baseline application 314 is an application that has been instantiated, but has not been configured. The baseline application may include a set of configuration tables 316 that will be populated by the deployment module 230. The baseline application 314 may further include other tables, data structures, and storage locations that may be populated by the deployment module 230 with one or more of transactional data, application data, content, or other data. However, the application execution environment 104 may also, or alternatively, include an application instance that has already been configured.

In some embodiments, the application execution environment 104 also includes a deployment log 318. However, the deployment log 318 may also, or alternatively, be stored elsewhere. Other locations where the deployment log 318 may be stored include within an application configuration environment, a storage location accessible via a network, or elsewhere. The deployment log 318 may be stored in a database, as files in a file storage system, or other data storage format allowing for storage and access to the data stored therein. The deployment log 318 stored data with regard to application deployment activities performed with regard to application instances, such as the baseline application 314, in application execution environments 104. As deployment activities are performed by the deployment module 230, data representative of the deployment activities performed are written to the deployment log 318. The data written to the deployment log 318 for each activity may also include one or more indicators of success or failure of the respective activity, data identifying an application configuration environment from which the deployment is made, data identifying an application execution environment 104 to which the deployment is made, a date and time the deployment is being made, a user, administrator, or process that initiated the deployment, and other data depending on the requirements of or preferences for the particular embodiment. Such other data may include data identifying a type of content or data deployed.

The deployment module 230, when executed, typically operates to deploy an application configured in an application configuration environment. Deployment is typically performed by one or more of the processes of the deployment module 310. These processes may include the configuration setting deployment process 304, the data deployment process 308, the activation process 306, and the delta deployment process 310. Some embodiments of the deployment module 230 may include one or more of these processes.

In some embodiments, as each deployment activity is performed by one or more of the configuration setting deployment process 304, the data deployment process 308, the activation process 306, and the delta deployment process 310, data representative of the deployment activity being performed is written to the deployment log 318. In some embodiments, data representative of the deployment activity being performed is written to the deployment log 318 by the respective process 304, 306, 308, 310 performing the deployment activity. In some such embodiments, the respective process 304, 306, 308, 310 may write the data representative of the deployment activity to the deployment log 318 through a method or service call to the deployment logging process or object 311. In other embodiments, deployment activity logging functionality may be included within executable instructions of the respective processes 304, 306, 308, 310. In other embodiments, the deployment logging process or object 311 monitors deployment activities performed within the deployment module 230 and writes data representative of the deployment activities to the deployment log 318.

Although the deployment logging process or object 311 is illustrated within the deployment module 230, other embodiments include the deployment logging process or object 311 as a standalone application or as a process or object that executes separately from the deployment module 230 and the application execution environment.

The configuration setting deployment process 304 typically deploys configuration settings to the configuration tables 326 of the baseline application 314 if the baseline application 314 has already been instantiated. However, in some embodiments, if the baseline system 314 has not been instantiated, the configuration setting deployment process 304, or other process of the deployment module may instantiate the baseline system 314 or call another process that will instantiate the baseline system 314. The deployment of the configuration settings may include a copying of configuration settings from the configuration tables of the configuration repository 242, as shown and described with reference to FIG. 3, to the configuration tables 316 of the baseline application. In some embodiments, a configuration setting that is copied to the baseline application 314 may refer to an item of content or data stored in the data repository 244, of FIG. 3, or the content repository 222, of FIG. 3. In some such instances, the configuration setting deployment process 304 may call a method of the data deployment process 308 to cause that data or content to be copied to the baseline application 314. In other embodiments, that data or content may be copied when the data deployment process 308 is executed at either an earlier or a later time.

The data deployment process 308 may be executed if there is data to deploy from the configuration workspace 228 or content to deploy from the data repository 244 or content repository 222 of FIG. 3. If there is data to deploy, the data may be copied from the configuration workspace 228 to application tables, data structures, storage locations, or other data stores in the application execution environment 104. If a proper table, data structure, storage location, or other data store does not exist in the application execution environment, the data deployment process, in some embodiments, is configured to execute, or call a method of another module, to cause that data location to be created or allocated.

Some embodiments of the deployment module 230 may further include the activation process 306. The activation process, in some embodiments, is configured to execute to activate the application 314 after it has been successfully deployed. In these and other embodiments, the activation process 306 may execute to activate only newly deployed or modified application 314 elements. In some instances, the activation process 314 may require an activation key, message, code, or other authorization from an activation authority to activate the configured baseline application 314. The activation authority may include one or more of a number of individuals or entities. An example of an activation authority may include an entity selling the baseline application 314 to be activated.

This activation process 306 and associated functionality may be utilized for several purposes. Some such purposes may include allowing the entity selling the application to ensure the application is properly configured, has passed certain testing necessary for the entity to ensure it will meet guaranteed service level agreements or objectives, for billing purposes, or other purposes that may benefit from such an activation process.

In some embodiments, the activation key, or other activation signal may be received over a network, such as the Internet. In other embodiments, the activation key, or other activation signal, may be manually input into an administration user interface or configuration table of the configured baseline application 314.

In some embodiments, the deployment module 230 may further include the delta deployment process 310. The delta deployment process is typically utilized after an application has already been deployed. When an application is deployed, or subsequently modified, a representation of the application configuration may be stored or updated in the deployment datastore 240 as described and illustrated with reference to FIG. 3. This may enable tracking of a current configuration of a deployed application. In embodiments including the delta deployment process 310, the scoping information may further be tracked on a historical basis to allow at least a view of a current configuration and a modified configuration not yet deployed, if applicable. The delta deployment process 310 may then use that historical tracking of the application configuration to identify changes between the current application configuration and the modified configuration not yet deployed. However, in other embodiments, a current state of an application 314 instance may be retrieved from the application execution environment 104 of the particular application 314 instance. The delta deployment process 310 may then only deploy the changes to the application configuration and any additional data and content needed or otherwise referenced by the new application configuration.

Figure 5:
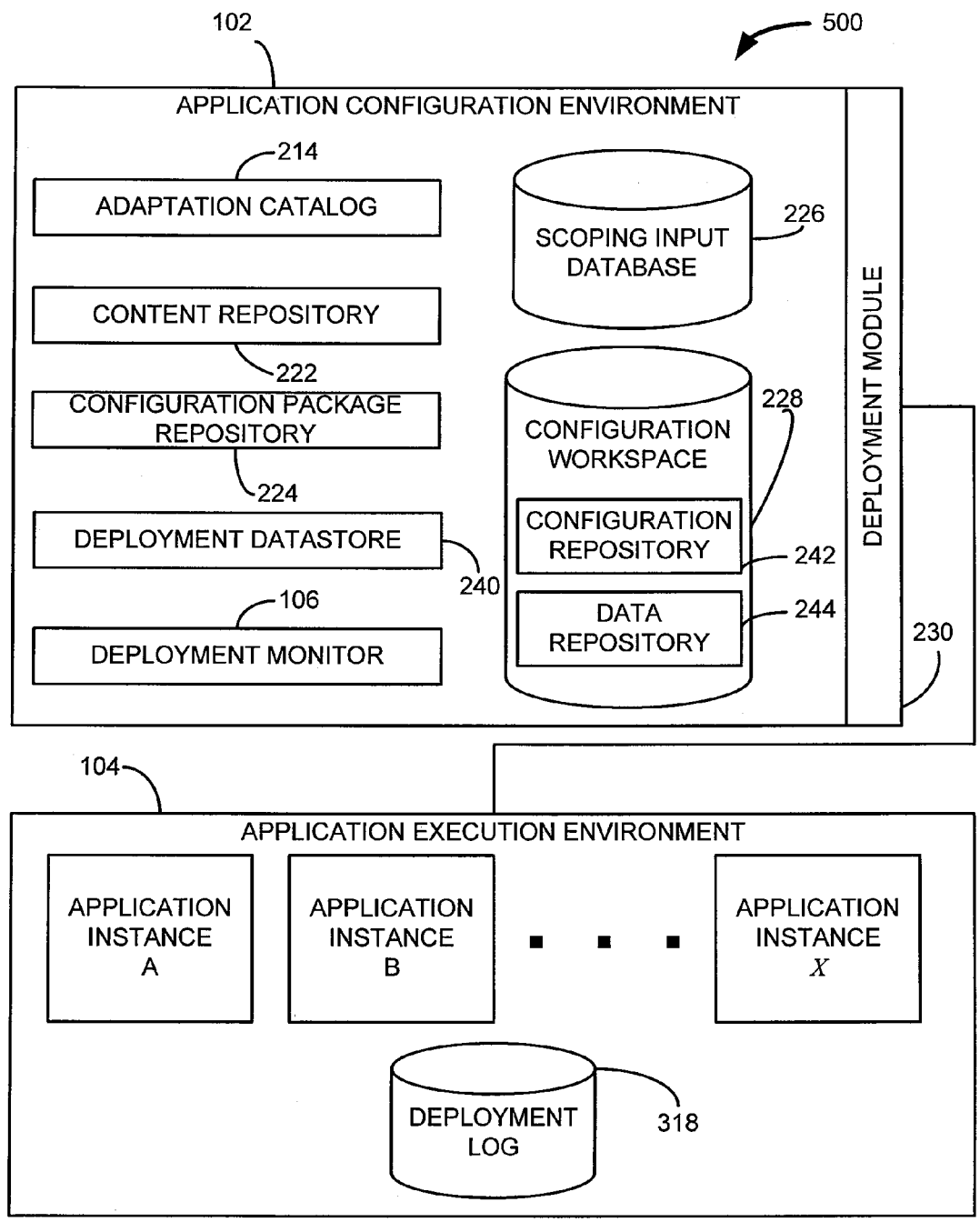
FIG. 5 is a block diagram of a system according to an example embodiment.

FIG. 5 is a block diagram of a system 500 according to an example embodiment. The system 500 includes the application configuration environment 102 as discussed above with regard to FIG. 1, FIG. 2, FIG. 3, and FIG. 4. The system 500 further includes the application execution environment 104.

The application execution environment 104 is a data processing environment within which an application, or an application to be deployed, may execute. When deploying an application, the deployment module 230 typically needs to know which application execution environment 104 and which application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B, . . . X) typically includes a set of identical configuration tables which may include distinct configuration settings from one another. In some embodiments, multiple instances of the application may exist such as to provide a development instance, a test instance, and a production instance. In such embodiments where there are multiple application instances, the deployment module 230 may deploy the configuration settings from one of the application instances in the application execution environment 104 to another application in the same or another application execution environment 104. Although the deployment module 230 is illustrated as being a part of the application configuration environment 102, the deployment module 230, in other embodiments, may be a standalone application or a part of another application or process.

The application configuration environment 102 of the system 500 also includes a deployment monitor 106. The deployment monitor 106 is an application or module that executes to provide a view of application instance deployment activities with regard to application instances deployed to one or more application execution environments 104. For example, the deployment monitor 106 may execute to retrieve data from the deployment log 318 and generate a view of the retrieved data providing a summary of deployment activities performed and deployment actions that were not successful. In some embodiments, the view of retrieved data may also provide a summary of activation actions performed, such as by the activation process 306 of FIG. 4. An example embodiment including such a view is illustrated and described with regard to FIG. 7.

Figure 6:
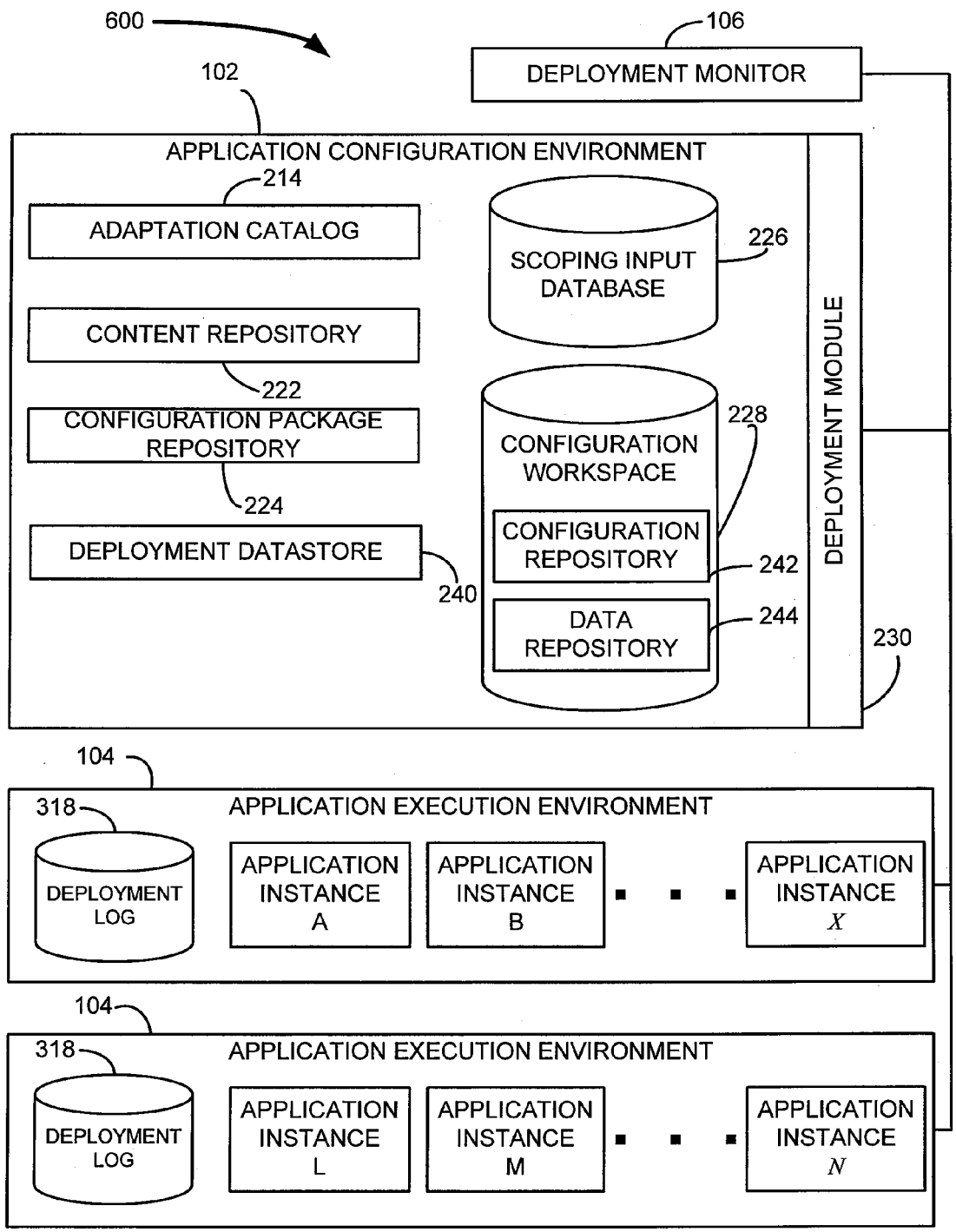
FIG. 6 is a block diagram of a system according to an example embodiment.

FIG. 6 is a block diagram of a system 600 according to an example embodiment. The system 600 includes the application configuration environment 102 as discussed above with regard to FIG. 1, FIG. 2, and FIG. 3. The system 600 further includes application execution environments 104.

The application execution environments 104 are data processing environments within which an application, or an application to be deployed, may execute. When deploying an application, the deployment module 230 typically needs to know which application execution environment 104, the type of the application, and which application instance within that application execution environment 104. In an application execution environment including only a single application instance, the instance may already be known.

Each instance of an application (i.e., application instances A, B, . . . X; or application instances L, M, . . . N) typically includes a set of identical configuration tables which may include distinct configuration settings from one another. In some embodiments, multiple instances of the application may exist such as to provide a development instance, a test instance, and a production instance. In such embodiments where there are multiple application instances, the deployment module 230 may deploy the configuration settings from one of the application instances in an application execution environment 104 to another application in the same or another application execution environment 104. Although the deployment module 230 is illustrated as being a part of the application configuration environment 102, the deployment module 230, in other embodiments, may be a standalone application or a part of another application or process.

In some embodiments, each application execution environment 104 may include it own deployment log 318. The deployment logs 318, as described above, include data representative of deployment activities performed with regard to application instances. The deployment logs 318 may be written to by one or more processes within the deployment module 230 or processes or applications external to the deployment module 230.

The deployment logs 318 may be utilized by the deployment monitor 106 to generate a view of the data providing a deployment summary with regard to application instances within the application execution environments 104. In some such embodiments, the deployment monitor 106 may execute to retrieve a first set of configuration settings including at least one set of configuration settings for an application instance from a memory device of a first computer hosting an application configuration environment 318. The deployment monitor 106 may further execute to retrieve a second set of configuration settings including configuration settings of the application instance from a memory device of a second computer hosting an application execution environment. The deployment monitor 106 may then execute to compare the first and second sets of configuration settings to identify configuration settings in the first set of configuration settings for the application instance not included in the second set of configuration settings for the application instance. From the comparing, the deployment monitor may then execute to generate and present a view of the identified configuration settings on a third computer, such as within a web browser of an administrator accessing the deployment monitor 106 over the Internet. In such embodiments, the identified configuration settings are configuration settings not yet deployed for the application instance from the application configuration environment to the application instance in the application execution environment. The view of the identified configuration settings presented by the third computer may include a visual indicator of the existence of differences between the first and second sets of configuration settings.

In other embodiments, the deployment logs 318 are utilized in a different manner by the deployment monitor 106. In such embodiments, the application deployment module 230, when writing data to the deployment logs 318, writes a date-time-stamp of when the actions of the particular deployment were performed. In such embodiments, the deployment monitor 106 executes to retrieve deployment log data for an application instance within the application execution environments 104. The deployment monitor 106 then determines when a deployment was last performed for the application instance according to date-time-stamp data included in the retrieved deployment log data. The deployment monitor 106 may then determine when an application configuration environment 102 for the application instance was last updated. For example, the deployment monitor 106 may retrieve data from the application configuration environment 102 for the application instance, such as a most recent date-time-stamp of items stored in the application configuration environment 102 for the application instance. The date-time-stamp retrieved from the application configuration environment 102 may then be compared by the deployment monitor 106 to the most recent date-time-stamp retrieved from the application execution environment 104. A determination may then be made by the deployment monitor 106, based on the comparing, of whether or not the most recent modifications made in the application configuration environment 102 for the application instance have been deployed to the application execution environment 104 for the application instance. When the determining reveals that the application configuration environment 104 for the application instance has been modified since performance of the last deployment for the application instance, the deployment monitor 106 may provide in a view of retrieved deployment log data an indicator of the availability of a configuration update. The indicator of the availability of a configuration update, in some embodiments, indicates that one or more of a configuration update, a content update, or other update is available in the application configuration environment 102.

Figure 7:
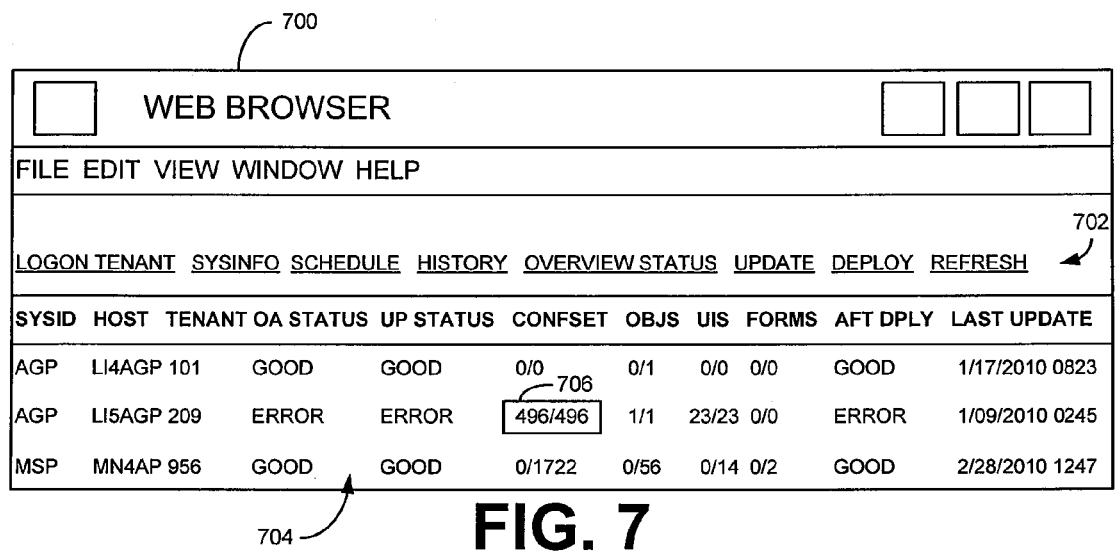
FIG. 7 is a user interface illustration according to an example embodiment.

FIG. 7 is a user interface 700 illustration according to an example embodiment. The user interface 700 is an example user interface that may be provided directly or indirectly via a web page or web enabled client application, by the deployment monitor 106 as described with regard to FIG. 1 and FIG. 6. The user interface 700 includes a listing 704 of a number of deployed application instances. The data for each application instance is provided in a row of the listing. The data of each row includes an identifier of a system type (SYSID) of the respective application instances along with a host identifier (HOST) and the tenant ID (TENANT) that identifies the application configuration environment to which the respective application instances are deployed. The data of each row of the listing 704 also provides an overall status (OA STATUS) and an update status (UP STATUS). Further, the data of each row of the listing 704 includes for each of a number of types of data that has been deployed, a number of errors in deploying data types and a number of data types deployed. For example, for TENANT 209 with SYSID AGP deployed to host LI5AGP into TENANT 209, 496 configuration settings (CONFSET) have been deployed and 496 include errors. Other data types include objects (OBJS), user interfaces (UIS), and forms (FORMS). The data types represented in the listing 704 can generally be considered content items, but the data types need not be so limited. The data types represented in the listing can be virtually any items that might be deployed in particular embodiments. The errors represented may be virtually any type of error that might occur, such as a failure to copy data to the respective application instance, failure to connect to the host application execution environment of the respective application instance, a failure of an activation process to activate one or more content items, and other errors that might occur and be included in a deployment log.

Data representative of other conditions may also be provided in the listing 704. Such data need not come entirely from a deployment log. For example, if upgrades are available for an application instance, data may be retrieved from an application configuration environment, upgrade server maintained by an entity that authored a particular deployed application, or elsewhere, compared to data retrieved from a deployment log for an application instance, and a determination may be made if the available upgrades have yet been deployed. If not deployed, the availability of upgrades may be represented in the listing 704. Further, if configuration changes have been made in an application configuration environment for an application instance but have not yet been deployed, such a status may also be represented in the listing 704 of the user interface 700.

Considering another application instance represented in the listing, for the TENANT 101 with SYSID AGP deployed to host LI4AGP, there was one object (OBJ) deployed and no errors occurred. Thus, the overall status (OA STATUS), update status (UP STATUS), and after deployment status (AFT DPLY) are all GOOD. Conversely, for TENANT 209 with SYSID AGP deployed to host LI5AGP as discussed above, the last deployment attempted included errors. Due to the errors encountered, the overall status (OA STATUS), update status (UP STATUS), and after deployment status (AFT DPLY) are all ERROR. The GOOD or ERROR statuses may be set based on a number of criteria depending on the particular embodiment. If a particular error encountered during a deployment is known to be critical, one or more particular statuses represented in the user interface 700 may be set to ERROR. In some embodiments, the text of the statuses may be set to a particular color representative of the status, such as red for ERROR and green for GOOD. In other embodiments, instead of text, icons or other graphical elements may be utilized to represent status, such as a red icon for ERROR and a green icon for GOOD.

In some embodiments, the deployed data type counts and error counts may be presented in colored text or highlighted by particular colors to draw attention to the represented data. For example, block 706 within the user interface 700 may be highlighted red to draw attention to the 496 errors or the text within the block may red or bolded.

The rows of data included in the listing 704 of the user interface 700 may be selected. The rows may be selected through input provided with an input device of a computing device providing a view of the user interface 700. Such an input device may include a pointer, such as a mouse or touchpad, a keyboard or other keypad device, a touch screen, or other input device. When selected, a row may be highlighted. In other embodiments, each row may include a check box user interface control. Rows may be selected, in some embodiments, in combination, such as two or more rows that may or may not be contiguously displayed within the listing 704 of the user interface 700. When one or more rows are selected, further input may be provided through selection of an action item 702.

The action items 702 are actions that can be triggered through selection of a particular action item 702 while one or more rows are selected within the listing 704. The action items may be selected through use of an input device as described above with regard to the row selection. The action items 702 as illustrated in the user interface 702 are hyperlinks. These hyperlinks, when selected, may call logic included in an application or markup language providing the user interface 700 to identify which rows of the listing 704 are selected. In other embodiments, the action items 702 are a type of user interface control, such as action buttons.

The action items 702 included in the user interface 700 include LOGON TENANT, SYSINFO, SCHEDULE, HISTORY, OVERVIEW STATUS, UPDATE, DEPLOY, and REFRESH. When the LOGON TENANT action item 702 is selected, a user is provided another user interface to log in to the particular application instance or instances selected within the listing 704 and a detailed view of deployment log data with regard to the particular application instance or instances selected is provided. When the SYSINFO action item 702 is selected, a further user interface is provided that displays additional information about the particular application instance selected in the listing 704. When the SCHEDULE action item 702 is selected, a user interface is provided to a user to schedule a future deployment. When the HISTORY action item 702 is selected, a user interface is provided which displays deployment history data retrieved from a deployment log for the selected application instance in the rows of the listing 704. When the OVERVIEW STATUS action item 702 is selected, the user interface 700 of FIG. 7 is again displayed. In some embodiments, the user interface 700 includes only the HISTORY action item 702. When the user interface displayed following selection of the HISTORY action item 702 is displayed, the OVERVIEW STATUS action item 702 is then displayed, but not the HISTORY action item 702. Returning to the user interface 700 of FIG. 7, selection of the UPDATE action item 702 will cause a command to be issued to trigger performance of a configuration update, a content update, or other update related to the selected row. Similarly, selection of the DEPLOY action item 702 will cause a command to be sent to the deployment module to deploy any configuration changes made in the application configuration environment that have not yet been deployed. This may include restarting a deployment process for which errors were encountered. Selection of the REFRESH action item 702 causes the user interface 700 to recollect the data underlying the rows of the listing 704 and refresh the rows.

Figure 8:
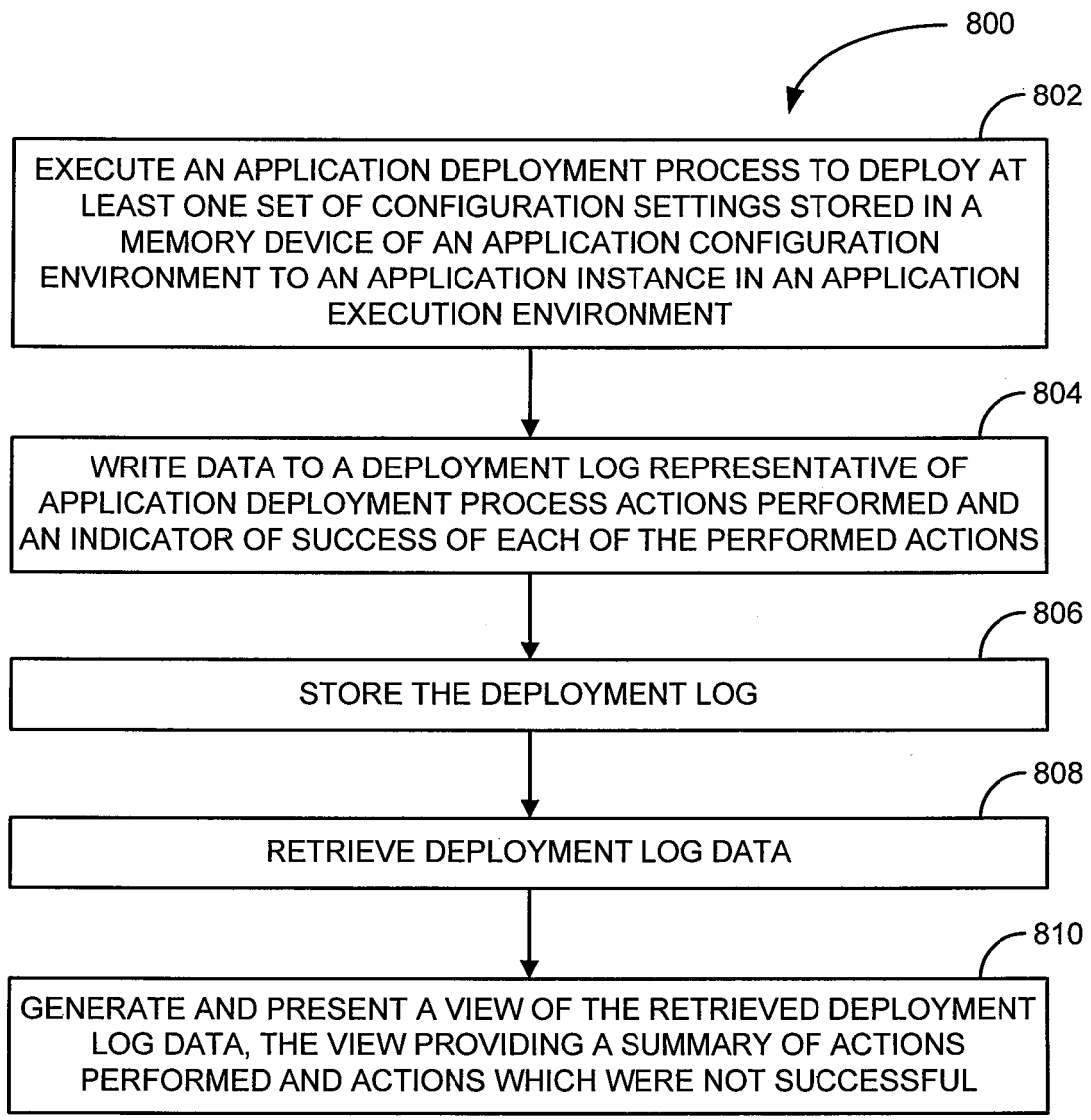
FIG. 8 is a block flow diagram of a method according to an example embodiment.

FIG. 8 is a block flow diagram of a method 800 according to an example embodiment. The method 800 is an embodiment that includes execution of a deployment process with regard to an application instance and providing a view of the status of the deployment performed. The method 800 is performed by at least one computer including at least one processor, at least one memory device, and at least one data storage device. The method 800 includes executing 802, on at least one processor, an application deployment process to deploy at least one set of configuration settings stored in a memory device of an application configuration environment to an application instance in an application execution environment. The method 800 further includes writing 804 data to a deployment log representative of application deployment process actions performed and an indicator of success of each of the performed actions and storing 806 the deployment log on a data storage device. The method 800 further includes retrieving 808 deployment log data from the data storage device and generating and presenting 810 a view of the retrieved deployment log data, such as in the user interface 700 of FIG. 7. In some embodiments, the view provides a summary of actions performed and actions that were not successful.

In some such embodiments of the method 800, the application configuration environment and the application execution environment are computing environments on disparate computing devices.

In some embodiments, the method 800 may further include executing, on the at least one processor, an application activation process to activate at least a portion of the application instance to which the application deployment process deployed the at least one set of configuration settings. This embodiment also includes writing data to the deployment log representative of application activation process actions performed and an indicator of success of each of the performed actions.

The deployment log, in some embodiments of the method 800, includes data for a plurality of application instances. In such embodiments, the method 800 may further include retrieving deployment log data for each of the plurality of application instances. The generating and presenting 810 of the view of the retrieved deployment data in such embodiments includes generating and presenting 810 a summary view of the retrieved deployment log data for each of the plurality of application instances. An example of such as summary view is illustrated and described with regard to FIG. 7. When retrieving deployment log data for each of the plurality of application instances, two or more of the plurality of application instances may be deployed within different application execution environments.

In some embodiments, presenting the summary view includes presenting an image representative of data on a monitor or other display device of a computer performing the method 800. In other embodiments, presenting the view may include generating a data set for transmission over a network to an application on another computer which will generate a view of the data set on a display device. Thus, presenting a view typically includes processing data to generate a data set from which a monitor may display the view. However, the view may be presented locally or remotely from the computer performing the method 800 depending on the particular embodiment.

Figure 9:
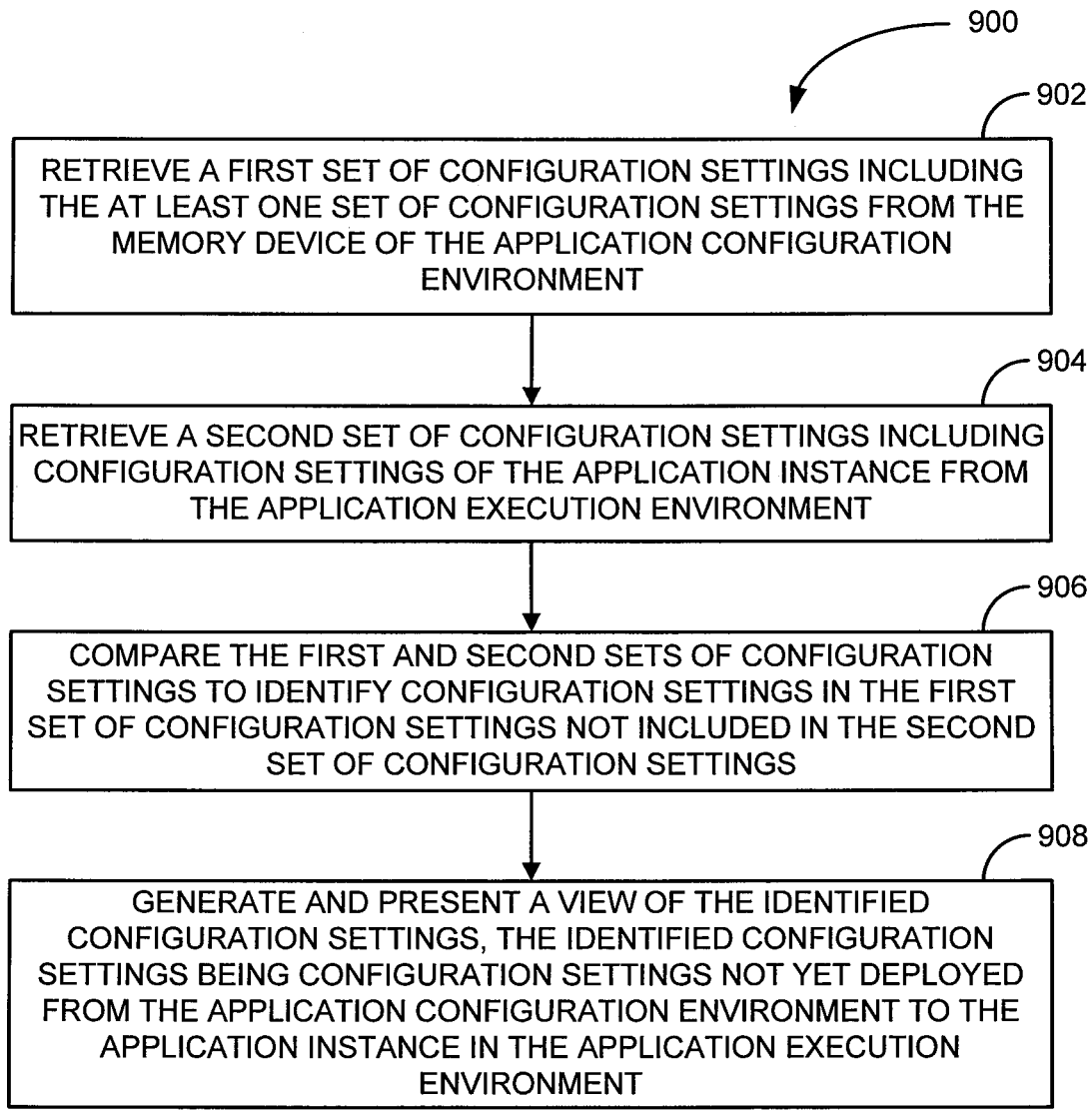
FIG. 9 is a block flow diagram of a method according to an example embodiment.

FIG. 9 is a block flow diagram of a method 900 according to an example embodiment. The method 900 executes to determine if there are configuration settings in an application configuration environment for a deployed application instance that have not yet been deployed and providing an indication of the determination. The method 900 includes retrieving 902 a first set of configuration settings including the at least one set of configuration settings from the memory device of the application configuration environment. The method 900 further includes retrieving 904 a second set of configuration settings including configuration settings of the application instance from the application execution environment. The method 900 may then compare 906 the first and second sets of configuration settings to identify configuration settings in the first set of configuration settings not included in the second set of configuration settings. Following the comparing 906, the method 900 may then generate and present 908 a view of the identified configuration settings. The identified configuration settings in such embodiments are configuration settings not yet deployed from the application configuration environment to the application instance in the application execution environment. In some embodiments of the method 900, the method may be performed with regard to each of a plurality of application instances, such as each of the application instances included in the listing 704 of FIG. 7.

Some such embodiments of the method 900 may further include receiving an input command to execute the application deployment process to deploy the identified configuration settings to the application instance in the application execution environment. The input command in such embodiments may be received through selection of an action item within a user interface, such as the DEPLOY action item 702 within the user interface 700 illustrated and described above with regard to FIG. 7.

Figure 10:
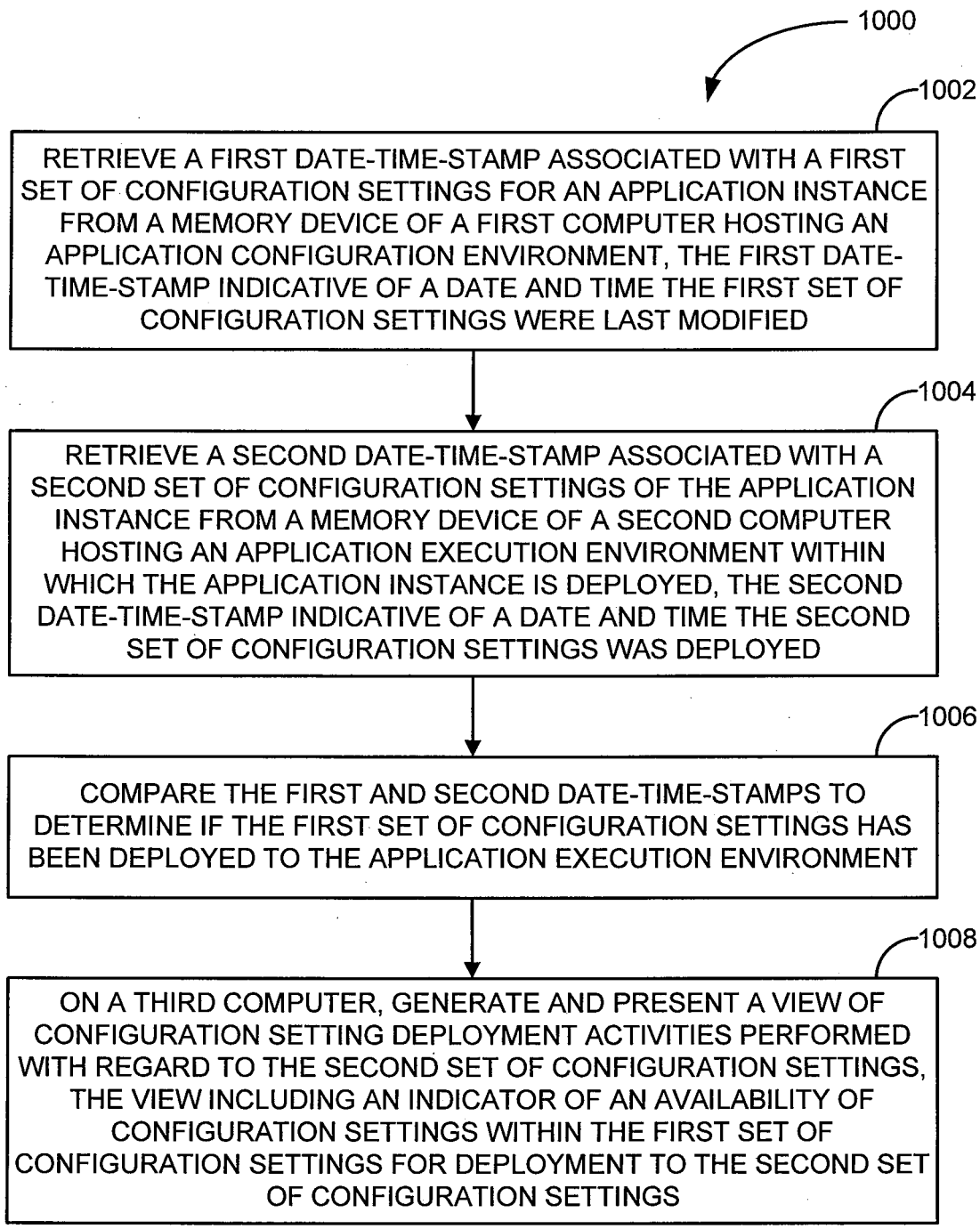
FIG. 10 is a block flow diagram of a method according to an example embodiment.

FIG. 10 is a block flow diagram of a method 1000 according to an example embodiment. The method 1000 in another embodiment of a method that executes to determine if there are configuration settings in an application configuration environment for a deployed application instance that have not yet been deployed and providing an indication of the determination. The method 1000 includes retrieving 1002 a first date-time-stamp associated with a first set of configuration settings for an application instance. The first date-time-stamp may be retrieved from a memory device of a first computer hosting an application configuration environment. The first date-time-stamp is indicative of a date and time the first set of configuration settings were last modified. The configuration settings may include application configuration settings, content, areas, packages, topics, options, scoping information, and other data that may be relevant to configuring a particular application instance depending on the particular embodiment.

The method 1000 further includes retrieving 1004 a second date-time-stamp associated with a second set of configuration settings of the application instance from a memory device of a second computer hosting an application execution environment within which the application instance is deployed. The second date-time-stamp is indicative of a date and time the second set of configuration settings was deployed. The method 1000 may then compare 1006 the first and second date-time-stamps to determine if the first set of configuration settings has been deployed to the application execution environment. Following the comparison, a third computer may generate and present 1008 a view of configuration setting deployment activities performed with regard to the second set of configuration settings. The view in such embodiments may include an indicator of an availability of configuration settings within the first set of configuration settings for deployment to the second set of configuration settings.

When the indicator of the availability of configuration settings indicates configuration settings are available, some embodiments of the method 1000 further include receiving an input command to execute an application deployment process to deploy the first set of configuration settings to the second set of configuration settings.

In some embodiments of the method 1000, the third computer is the computer performing the method 1000. The third computer may retrieve the first and second date-time-stamps via a network interface device over a network from the first computer and the second computer, respectively. In these and further embodiments, the view is presented by the third computer in a document generated by the third computer and sent to a requestor over a network. The document may include a markup language document, such as an HTML document displayable within a web browser.

Figure 11:
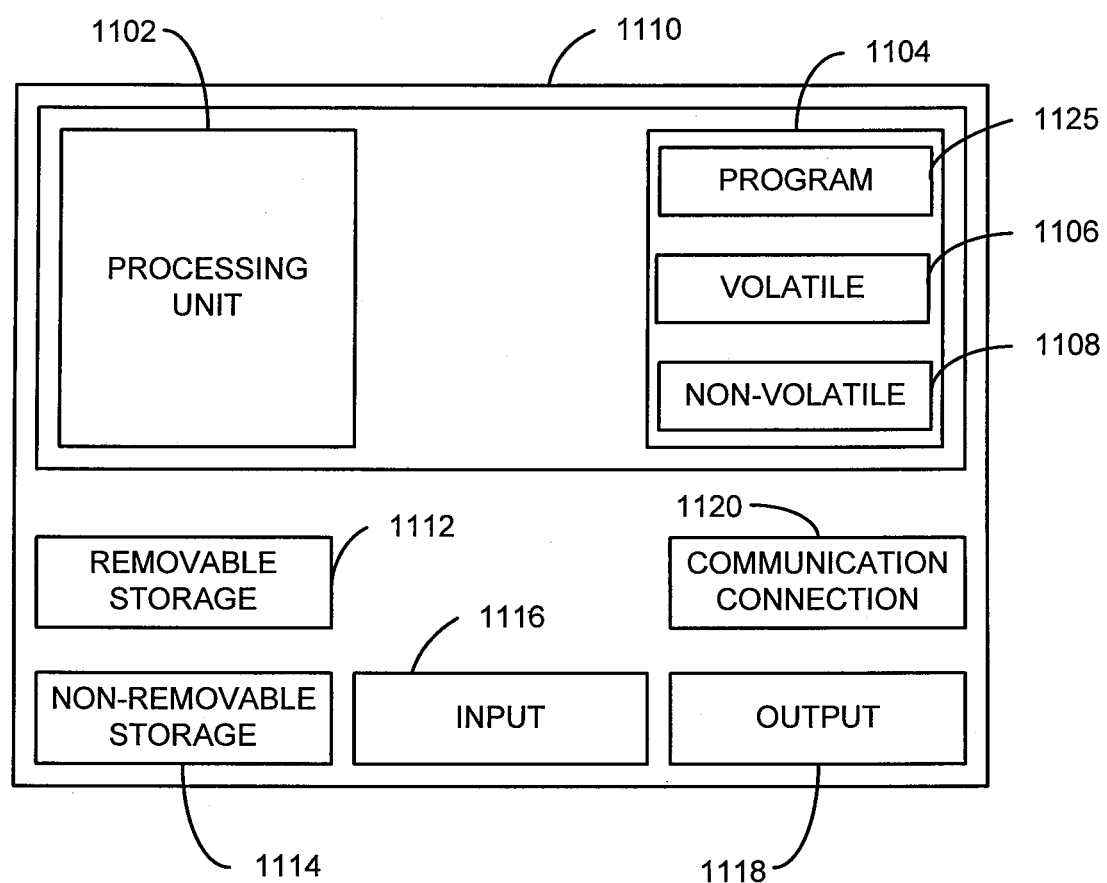
FIG. 11 is a block diagram of a computing device according to an example embodiment.

FIG. 11 is a block diagram of a computing device according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 1110, may include at least one processing unit 1102, at least one memory 1104, removable storage 1112, and non-removable storage 1114. Memory 1104 may include volatile memory 1106 and non-volatile memory 1108. Computer 1110 may include—or have access to a computing environment that includes—a variety of computer-readable media, such as volatile memory 1106 and non-volatile memory 1108, removable storage 1112 and non-removable storage 1114. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1110 may include or have access to a computing environment that includes input 1116, output 1118, and a communication connection 1120. The computer may operate in a networked environment using a communication connection to connect to one or more remote computers, such as database servers, application servers, web servers, file servers, and other servers. Such servers may be physical computing devices or logical processes that execute on a physical computing device. The remote computer may include a personal computer (PC), server, router, network PC, a handheld computing device, a smart phone, a peer device, or other common network node, or the like. The communication connection may include a Local Area Network (LAN), a Wide Area Network (WAN), a System Area Network (SAN), the Internet, a Virtual Private Network (VPN), and other networks.

Computer-readable instructions stored on a computer-readable medium are executable by the processing unit 1102 of the computer 1110. A hard drive, CD-ROM, and RAM are some examples of articles including a computer-readable medium. For example, a computer program 1125 capable of performing one or more of the methods, or portions thereof, when executed by the at least one processor 1102 as described herein may be stored on a computer readable medium.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   at least one processor;
   at least one memory;
   an application configuration environment including:
      a configuration repository, stored in the at least one memory, including configuration settings of at least one instance of an application; and
      a data repository, stored in the at least one memory, including data and content for deployment to the at least one instance of the application;
   a deployment module stored in the at least one memory and executable by the at least one processor to deploy the at least one application instance to an application execution environment including the at least one application instance, the deployment module executable by the at least one processor to:
      deploy configuration settings from the configuration repository to the application execution environment;
      execute an activation process to activate functionality of the at least one application instance;
      deploy data from the data repository to one or more data stores in the application execution environment; and
      generate log entries in a deployment log repository of the application execution environment for performed deployment and activation actions;
   a deployment monitor module stored in the at least one memory and executable by the at least one processor to:
      retrieve data from the deployment log repository and generate a view of the retrieved data, the view renderable to provide a summary of deployment and activation actions performed and deployment and activation actions which were not successful; and provide an indicator in the view indicating an update to the at least one application instance is available, the indicator activated by:
 determining when a deployment was last performed for the at least one application instance according to date-time-stamp data included in the retrieved deployment log data;
 retrieving data from the application configuration environment for the at least one application instance;
 determining, based on the data retrieved from the application configuration environment, when the application configuration environment for the at least one application instance was last modified;
 when the application configuration environment for the at least one application instance has been modified since performance of the last deployment, activating, the indicator in the view indicating a configuration update is available.

2. The system of claim 1, wherein the indicator of an available update in the application configuration environment for the at least one application instance is a user interface element, the selection of which triggers execution of the deployment module to deploy data from the application configuration environment not yet deployed to the at least one application instance in the application execution environment.

3. The system of claim 1, wherein the deployment monitor module is further executable by the at least one processor to:
 retrieve deployment log data of a plurality of application instances from deployment log repositories of a plurality of application execution environments, each application execution environment including, at least one application instance; and
 generate a view of the retrieved data providing, for each application instance, a summary of deployment and activation actions performed and a number of which actions were not successful.

4. The system of claim 3, wherein the deployment monitor module is further executable by the at least one processor to:
 retrieve data from configuration repositories of each of the plurality of application instances;
 compare the data retrieved from the configuration repositories to data deployed to the application execution environments of respective application instances to identify differences; and
 provide, for each application instance, at least one visual indicator of the identified differences.

5. The system of claim 1, wherein the summary of deployment and activation actions performed and deployment and activation actions that were not successful includes a count of deployment and activation actions that were not successful.

6. The system of claim 1, wherein the application configuration environment and the application execution environment are computing environments on disparate computing devices.

7. A method comprising:
 executing, on at least one processor, an application deployment process to deploy at least one set of configuration settings stored in a memory device of an application configuration environment to an application instance in an application execution environment;
 writing data to a deployment log representative of application deployment process actions performed, an indicator of success of each of the performed actions, and a date-time-stamp of when the actions were performed;
 storing the deployment log on a data storage device;
 executing, on the at least one processor, an application activation process to activate at least a portion of the application instance to which the application deployment process deployed the at least one set of configuration settings;
 writing data to the deployment log representative of application activation process actions performed and an indicator of success of each of the performed actions;
 retrieving deployment log data from the data storage device; and
 generating and presenting a view of the retrieved deployment log data, the view renderable to provide a summary of actions performed and actions that were not successful.

8. The method of claim 7, wherein the application configuration environment and the application execution environment are computing environments on disparate computing devices.

9. The method of claim 7, further comprising
 determining when a deployment was last performed for the application instance according to date-time-stamp data included in the retrieved deployment log data;
 retrieving data from the application configuration environment for the application instance;
 determining, based on the data retrieved from the application configuration environment, when the application configuration environment for the application instance was last modified;
 when the application configuration environment for the application instance has been modified since performance of the last deployment for the application instance, providing an indicator in the presented view of the retrieved deployment log data of the availability of a configuration update.

10. The method of claim 9, further comprising:
 receiving an input command to execute the application deployment process to deploy the un-deployed data from the application configuration environment for the application instance to the application execution environment for the application instance.

11. The method of claim 7, wherein the deployment log includes data for a plurality of application instances, the method further comprising:
 retrieving deployment log data for each of the plurality of application instances; and
 generating and presenting a view of the retrieved deployment log data, the view providing, for each of the plurality of application instances, a summary of actions performed and actions that were not successful.

12. The method of claim 11, wherein at least two of the plurality of application instances are deployed within different application execution environments.

13. The method of claim 12, wherein the generated and presented view for each of the plurality of application instances includes an identifier of an application execution environment within which the particular application instance is deployed.

14. A non-transitory computer-readable storage medium, with instructions stored thereon, which when executed by a processor of a computer, cause the computer to:
 deploy at least one set of configuration settings stored in a memory device of an application configuration environment to an application instance in an application execution environment;
 write data to a deployment log representative of application deployment process actions performed, an indicator of success of each of the performed actions, and a date-time-stamp of when the actions were performed;

store the deployment log on a data storage device;

execute an application activation process to activate at least a portion of the application instance to which the application deployment process deployed the at least one set of configuration settings;

write data to the deployment log representative of application activation process actions performed and an indicator of success of each of the performed actions;

retrieve deployment log data from the data storage device; and generate and presenting a view of the retrieved deployment log data, the view providing a summary of actions performed and actions that were not successful.

15. The non-transitory computer-readable storage medium of claim 14, wherein the application configuration environment and the application execution environment are computing environments on disparate computing, devices.

16. The non-transitory computer-readable storage medium of claim 14, with further instructions stored thereon, which when executed by the processor of the computer, cause the computer to:

determine when a deployment was last performed for the application instance according to date-time-stamp data included in the retrieved deployment log data retrieve data from the application configuration environment for the application instance;

determine, based on the data retrieved from the application configuration environment, when the application configuration environment for the application instance was last modified;

when the application configuration environment for the application instance has been modified since performance of the last deployment for the application instance, provide an indicator in the presented view of the retrieved deployment log data of the availability of a configuration update.

17. The non-transitory computer-readable storage medium of claim 16, with further instructions stored thereon, which when executed by the processor of the computer, cause the computer to:

receive an input command to execute the application deployment process to deploy the un-deployed data from the application configuration environment for the application instance to the application execution environment for the application instance.

18. The non-transitory computer-readable storage medium of claim 14, wherein the deployment log includes data for a plurality of application instances, the non-transitory computer-readable storage medium including further instructions stored thereon, which when executed by the processor of the computer, cause the computer to:

retrieve deployment log data for each of the plurality of application instances; and generate and present a view of the retrieved deployment log data, the view providing, for each of the plurality of application instances, a summary of actions performed and actions that were not successful.

* * * * *